D. G. LITTLEFIELD.
Base Burning Stove.
No. 1,976. Reissued May 30, 1865.
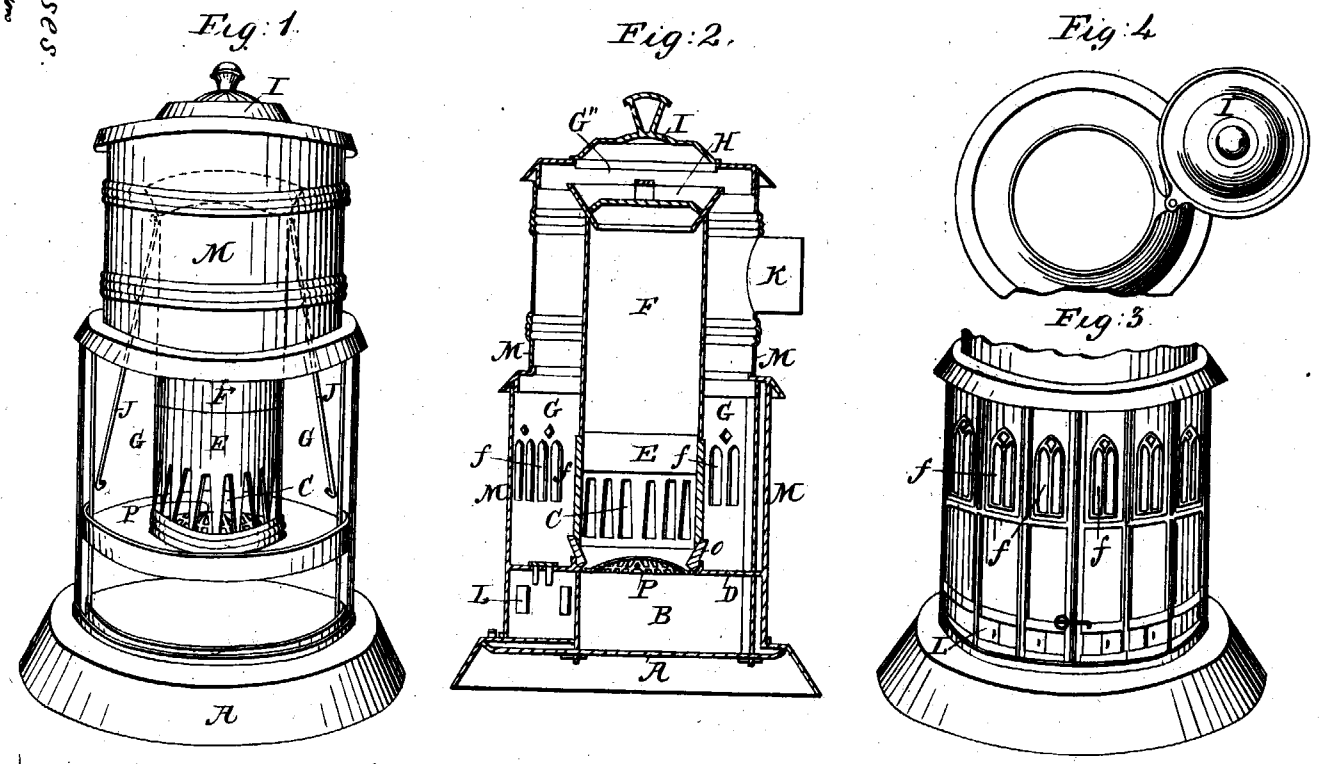
Witnesses.
Charles E. Wilson
Edw. F. Brown
Inventor.
Dennis G. Littlefield
N. PETERS, Photo-Lithographer, Washington, D. C.

UNITED STATES PATENT OFFICE.

DENNIS G. LITTLEFIELD, OF ALBANY, NEW YORK.

BASE-BURNING STOVE.

Specification forming part of Letters Patent No. 10,448, dated January 24, 1854; Reissue No. 1,236, dated November 19, 1861; Reissue No. 1,814, dated August 26, 1862; Reissue No. 1,815, dated March 3, 1863; Reissue No. 1,823, dated November 8, 1864; Reissue No. 1,890, dated February 28, 1865; Reissue No. 1,976, dated May 30, 1865.

*To all whom it may concern:*

Be it known that I, DENNIS G. LITTLEFIELD, of Albany, in the county of Albany and State of New York, have invented certain new and useful improvements in that class of stoves designed for the combustion of anthracite and other concentrated fuels, and which contain a magazine or fuel-supplying cylinder for the reception of a supply of fuel to be held in reserve; and I do hereby declare that the following is a full, clear, and exact description of my invention, reference being had to the accompanying drawings and the letters of reference marked thereon, the same forming a part of this specification, in which—

Figure 1 represents a perspective view of a stove having my improvements applied. Fig. 2 represents a vertical section of Fig. 1, showing the arrangement of the various parts and their adaptation to each other. Fig. 3 represents an illuminating-case, showing the arrangement thereof when combined with a stove in which a portion of its surface is concealed by being placed against a wall or otherwise.

Similar letters of reference indicate corresponding parts of the several figures.

The class of stoves to which my invention relates contains three active parts—viz., a place where the fuel is burned, a fuel-supplying cylinder to contain a supply of reserve fuel, and a chamber or chambers to receive from the burning fuel the gaseous products of combustion and convey them to the chimney-flue. As a principle or mode of operation, the quantity of fuel ignited at any one time is less than in that class of stoves not employing a magazine for reserve fuel and consumed at a more elevated temperature than in such stoves, it being intended that the intensity of heat and rapidity of combustion should be regulated by supplying air at the base. One serious practical objection to some of this class of stoves as constructed prior to my invention was due to the fact that they could not be properly controlled in their action by an air-supplying register at the base. From careful investigation I discovered that the difficulty arose in consequence of atmospheric air entering the stove through the cover-opening at the top of the supplying-cylinder, it being a practical impossibility to make the cover fitting thereon air-tight and still be so applied as to be readily and easily removed to supply fuel. This discovery accounted for the objectional working of stoves thus constructed, which, when in operation, were attended with frequent puffs, explosions, and a premature ignition of the coal in the supplying-cylinder. In others the grate to uphold the fuel was made to form the bottom of the supplying-cylinder, and was permanently attached thereto, the lower part of said cylinder being also made to serve the purpose of a fire-pot, and also as an ash-pit below the grate thereto attached, the whole being placed in a chamber having a smoke-flue, by which such chamber could be connected with the chimney. In this description of stoves the part forming in one continuous piece the ash-pit, fire-pot, and supplying-cylinder being inclosed within a chamber that was intended to communicate with the chimney, atmospheric air could not easily reach the coal through the top of said supplying-cylinder; but as that part of the stove forming the ash-pit, fire-pot, and supplying-cylinder had to be lifted out and in to remove cinders and clean the stove at each time of building a fire, it was wholly unfitted for practical purposes, except in some few particular cases. Again, the lower part of the supplying-cylinder being used to burn the coal in, the fuel had to be of the softer kind—such as coke, or charcoal of wood—and burned at a comparatively low temperature, in order to avoid its premature burning out and destruction; and hence it was that stoves of this latter construction were never designed for use, except for heating book binders' tools, in which case only a gentle heat is required.

To overcome such defects and to produce a fuel-supplying-cylinder stove that shall be complete in its action and at all times safe and under perfect control is the object of my invention, the nature of which consists in the combination, adaptation, and permanent connection, as a complete manufactured article or an individual thing, of the organic parts of a fuel-supplying-cylinder stove, having its supplying-cylinder so adapted to the place where the fuel is burned and to the chamber receiving the products of combustion therefrom as to prevent atmospheric air entering said cylinder from the top when once in operation, whereby explosions and the premature ignition of the reserve fuel are prevented, while at the same time the operation of cleaning out, replenishing, and building a fire in such stoves is easy, convenient, and expeditious, thus making a practical and economical base-burning stove. Moreover, I have discovered a great advantage, in burning authracite coal, in so constructing such stoves as to prevent the entrance of atmospheric air to their supplying-cylinder when once in operation, thereby causing to accumulate within the supplying cylinder a volatile combustible, such accumulation taking place immediately after supplying coal thereto, consequent upon the air passing therein with said supply-coal, necessarily passing to the burning fuel, and no more air being able to pass therein, such space made vacant by the descent of such atmospheric air will take up from the highly-heated fuel a volatile product—such as light carbureted hydrogen and other gases, more or less of which are combustible—and so as to completely fill the interstices among the supply-coal, and, thus accumulating, will press down among the ignited fuel, until meeting the supply-air from the base, where they will be burned, and thereby cause the coal at that point to be the first portions consumed to ashes; also making the action of such stoves more sensitive and quicker to act upon the admission of the supply-air at the base, inasmuch as such volatile product is made to act as a kindling, as it were, to aid in consuming the refractory portions of the coal, thus making a stove for the combustion of authracite that can burn only at the base.

In order to enable those skilled in the art to which my invention belongs to make, construct, and use the same, I will proceed to describe it.

In the accompanying drawings, A is the base or bottom of the stove, above which is the ash-pit B. This is formed by an annular or other formed plate, D, which is permanently secured to other parts or to the base of the stove. Said ash-pit is provided with a register, L, to regulate the supply of air to support combustion. Resting upon the plate D is a ring, O, which in this instance forms the lower part of a fire-pot, E, which may be made of any convenient and desirable form, having a fire-grate, P, at the bottom thereof.

F is the fuel-supplying cylinder, placed over the fire-pot E, and is secured in place by stay-rods J J or other suitable device. It must be of sufficient capacity to contain a supply of unignited coal, upon which the cold fuel may be thrown without the disadvantage which would attend the introduction of fresh fuel into an intensely-heated chamber. The fuel thus introduced falls upon the top of that already contained therein, and gradually descends as the portion in the place of combustion is consumed, and in its descent becomes gradually heated and prepared for a more perfect combustion. The said supplying-cylinder is provided with a cover, H, which must be kept closed when the stove is in operation, but which may be made to fit like an ordinary cover for stoves, so that a portion of the steam or light gases generated and thrown off by a rapid heating of the reserve fuel may escape from under said cover, as occasion may require, without establishing a current sufficient to cause the passage in that direction of the gaseous products of combustion from the burning fuel.

To effectually avoid all liability to premature ignition of the reserve fuel or danger of explosion, and permit and cause to accumulate within the supplying-cylinder and among the interstices of its supply-coal of a volatile combustible, I inclose its cover-opening H within a chamber, G″, which is either a part of or, if not, should communicate directly with the chamber or space receiving the products of combustion from the burning fuel, and also with the smoke or exit flue K—that is, the chamber G″, which incloses the cover-opening H to the supplying-cylinder, must be exhausted by the exit or smoke flue K, so that if any air enters the chamber G″ it will pass or be drawn directly to the exit-flue K, that containing a more perfect vacuous space than that which is created within the supplying-cylinder above or among the interstices of the supply-coal by the descent of the atmospheric air which went therein with said supply-coal, as before described.

In this instance I form the chamber G″ by extending the case M M, which forms a chamber, G, up so as to surround the cover-opening H to the supplying-cylinder, and to communicate with the place where the fuel burns and the smoke-flue K, as seen in Fig. 2. The said chamber G″ is provided with a cover, I, through which the cover H may be removed to replenish the supplying-cylinder, or as other occasions may require.

When a stove thus constructed is put in operation, whatever atmospheric air passes therein with the supply-coal immediately settles to the burning fuel, and as no more air can pass therein, owing to the stronger vacuum of the exhausting exit-flue K, whatever space there may be within the supplying-cylinder above the supply-coal, and also the interstices among the supply-coal, is at once filled with a volatile product more or less combustible, which is taken up from the partially-ignited fuel to fill such space, so that at all times within the supplying-cylinder of my improved stove a volatile combustible is accumulating, and by its accumulation is forced downward to the burning fuel in the manner before described.

To build a fire in my improved stove, remove the cover I, through which the cover H may be reached and removed. Introduce the requisite kindling through the said openings I and H, and close the cover I, leaving the cover H open. Open the air-register L, and ignite the kindlings in the usual manner through the ash-pit, to which free access can be had by means of doors. Allow the said kindlings to burn up through the supplying-cylinder until the smoke has passed off and the chimney-flue has become sufficiently heated to establish a proper draft, after which the fuel-supplying cylinder may be filled with coal and the openings I and H both closed, leaving the air-supply register L open, so as to permit air to pass in at the base through the grate P to support combustion. The coal in the place where the fuel burns soon becomes ignited, while the reserve fuel contained in the supplying-cylinder is being prepared for a more perfect combustion, and, in connection with the gases arising from the heated coal in the manner before described, descends to the place of combustion. The gaseous products of combustion pass to the chambers G and G″, and finally through the smoke or exhausting exit flue K to the chimney.

Some of the parts of my improved stove represented in the accompanying drawings are more fully described and claimed in my Reissued Patents Nos. 1,814, 1,815, and 1,823. Consequently a detailed description here is unnecessary.

What I claim under this patent, as my invention, is—

The combination of a reserve-fuel-supplying cylinder, a separate fire-pot, a chamber to receive the products of combustion, and an exhausting exit-flue, substantially as and for the purposes described.

DENNIS G. LITTLEFIELD.

Witnesses:

EDWARD O. PAULL,
JAMES EASTERLY.